Oct. 11, 1960
C. I. HARON
2,955,906
METHOD OF MOLDING
Filed Aug. 17, 1956
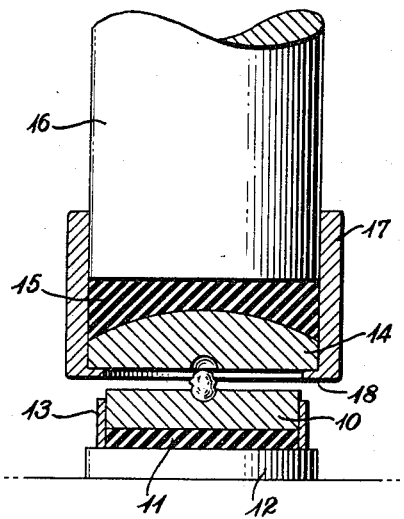
INVENTOR
*Carl I. Haron*
BY *Stevens, Davis, Miller and Mosher*
ATTORNEYS

United States Patent Office 2,955,906
Patented Oct. 11, 1960

2,955,906

METHOD OF MOLDING

Carl I. Haron, Dallas, Tex., assignor to Texas Instruments Incorporated, Dallas, Tex., a corporation of Delaware Filed Aug. 17, 1956, Ser. No. 604,824

1 Claim. (Cl. 18—47)

Present invention relates to a method for molding articles in a non-contaminating fashion and more particularly relates to a method for molding dope pellets to be utilized in a semiconductor crystal growing process, without contaminating the dope pellets.

In the manufacture of transistors, one of the more familiar techniques involves growing from seed, crystals of a semiconductor material. The technique is usually carried out in apparatus known as a crystal puller which can be operated in several ways to bring about the creation of a junction in the crystal being grown. Of the various methods of operation, a common one is the double doping technique. In following this technique, a charge containing an impurity of one type of conductivity is placed in a crucible and heated under a reducing atmosphere, such as hydrogen, until the charge is just molten. A seed crystal is then introduced, placed in contact with the surface of the molten charge, and rotated and slowly withdrawn as the molten charge crystallizes out onto the seed. If it is desired to alter the conductivity of the molten charge, say for example, from N type conductivity to P type conductivity it is necessary to introduce into the charge a sufficient quantity of an impurity of the other type to more than counteract the impurity already present. This is most readily accomplished by dropping pellets into the charge through tubes known as doping tubes. The pellets are composed of a semiconductor material combined with the desired impurity.

Essentially, there are two problems to be considered when making dope pellets. They are to produce pellets of a proper size to pass through the doping tubes leading to the crucible, and to prevent contamination of the pellets during their formation.

It is the principal object of the present invention to provide a unique method for making pellets generally, and doping pellets in particular, which will enable the pellets to be produced of the proper size to pass through doping tubes and also will avoid any possibility of contaminating the pellets.

There is a further object of the present invention to provide a novel method for molding pellets and in particular doping pellets which is exceedingly simple both in operation and in use and which will efficiently and economically solve the problems confronting one who is required to produce pellets which are of proper size and do not contain contaminating substances.

Other objects and advantages of the present invention will become more readily apparent from the following detailed description of the preferred embodiment of the present invention when taken with the appended drawing which shows in the sole figure thereof a molding apparatus as applied to doping pellets.

Referring now to the drawing in detail there is shown a molding apparatus comprised of a bottom die 10 and a top die 14 each defining in its working face a hemispherical indention or recess with the recesses being in registry whereby closing the dies results in the recesses defining a substantially spherical cavity. Underlying the bottom die 10 is a resilient pad 11 supported on a base 12. A retaining ring 13, fixed to the base 12, securely holds the resilient pad 11 and the lower die 10 in fixed position. It will be noted that the top edge of ring 13 terminates spaced below the top surface of the lower die 10. The upper die 14 is provided with a convex upper surface which is backed by a resilient pad 15 defining a lower concave surface complementary to the upper convex surface of the top die 14. Bearing against the top surface of the resilient pad 15 is a piston rod or plunger 16. A retaining ring 17 is fixed to the rod or plunger 16 and extends downwardly terminating in a radially inwardly extending annular flange 18. The top die 14 and pad 15 are held between the lower face of the rod or plunger 16 and the annular flange 18. The inner diameter of the flange 18 is slightly greater than the diameter of the lower die 10 so that it will not interfere with closing of the two dies. When the dies are closed, the top of ring 13 will be spaced below annular flange 18 permitting further movement of the dies as the resilient pads 11 and 15 are compressed.

The two dies are backed by resilient pads made from a suitable resilient material such as rubber or a rubber compound. By virtue of the two pads 11 and 15, the two dies can withstand more shocks and jamming without breaking or cracking than they could otherwise. This fact becomes of paramount importance in dealing with a die material which is brittle and which cannot stand up under the normal action of a molding press. By means of the arrangement described it now is possible to use as materials for the dies those which have been heretofore considered as useless for this purpose.

The molding pressure is applied by means of rod or plunger 16 from any convenient source of power, such as, a hydraulically operated cylinder or by hand.

Since it is desired to mold a pellet in a non-contaminated fashion, the two dies 10 and 14 are composed of one of the materials being molded and preferably is the material which is the predominant material of the mixture to be pelletized. For example, in the molding of arsenic dope pellets for silicon doped crystals, to be subsequently used in the manufacture of silicon transistors, the dies 10 and 14 are made of silicon of the same purity as used for the pellets. Silicon is a notoriously brittle metal and would never be considered seriously as a die material. However, in the present invention use of silicon dies becomes a possibility and even a reality. The pads 11 and 15 function to spread the molding pressure uniformly over the silicon dies and also to relieve against excessive pressure.

The present invention applies to all situations involving a contamination problem or the necessity of using brittle dies. Although there are many such situations it is considered expedient to confine the following discussion to one of them only which involves both aspects of such situations.

It has been discovered that arsenic in the gray form is hard and brittle. After some exposure to air, however, it becomes black on the outside and softer. When it is at this stage the softer arsenic form can be employed as a binding agent and can thus be used for pelletizing mixtures of silicon and arsenic for use as dope pellets. By using dies made of intrinsic silicon there is eliminated any possibility of contaminating the arsenic dope pellets produced by the dies. Thus, the pellets are composed of silicon and arsenic in the gray form after it has become blackened and softer plus particles of the dies which in this case are composed of silicon. The arsenic acts as the binding agent for the pellet. The size of the pellet to be produced is governed by the best multiple of common weights required and the inside diameter of whatever dope dropping mechanism is to be employed.

The above example portrays quite well the novel features of this invention. In the case given, it was necessary to avoid contamination by using for the dies a metal that is brittle. This immediately gave rise to a problem of how to use successfully brittle dies which was solved by employing the apparatus heretofore described.

Although the invention has been shown and described in terms of a preferred embodiment, nevertheless, various changes and modifications obvious to one skilled in the art are deemed to be within the spirit and scope of the invention.

What is claimed is:

A method of pelletizing a mixture of silicon and arsenic consisting of mixing granular silicon with granular arsenic that has been exposed to the atmosphere until it has become black and soft, and then compressing the mixture under suitable pressure between silicon dies.

References Cited in the file of this patent
UNITED STATES PATENTS

| Number | Name | Date |
|---|---|---|
| 213,601 | Woffenden | Mar. 25, 1879 |
| 687,893 | Marshall | Dec. 3, 1901 |
| 942,379 | Egly | Dec. 7, 1909 |
| 1,238,347 | Sebring et al. | Aug. 28, 1917 |
| 2,177,461 | Ruthven | Oct. 24, 1939 |
| 2,253,697 | Genesy | Aug. 26, 1941 |
| 2,304,663 | Smith et al. | Dec. 8, 1942 |
| 2,333,131 | Tillyer et al. | Nov. 2, 1943 |
| 2,573,365 | Scholes et al. | Oct. 30, 1951 |
| 2,745,139 | Burton | May 15, 1956 |
| 2,842,444 | Emblem et al. | July 8, 1958 |
| 2,857,623 | Clark | Oct. 28, 1958 |
| 2,883,723 | Moore et al. | Apr. 28, 1959 |